United States Patent [19]

Wakefield et al.

[11] Patent Number: 4,689,854

[45] Date of Patent: Sep. 1, 1987

[54] HEAT SEALING MACHINE

[75] Inventors: Barry R. Wakefield, Cambusbarron, Scotland; Francis J. Pullen, Willingham, England

[73] Assignee: Devro, Inc., Somerville, N.J.

[21] Appl. No.: 936,687

[22] Filed: Dec. 1, 1986

[51] Int. Cl.[4] .............................................. A22C 13/00
[52] U.S. Cl. ........................................ 17/1 R; 17/34; 428/35
[58] Field of Search ...................... 17/1 R, 33, 34, 49; 53/576, 550, 551, 549; 428/35

[56] References Cited

U.S. PATENT DOCUMENTS

| | | | |
|---|---|---|---|
| 4,411,048 | 10/1983 | Green | 17/49 |
| 4,500,574 | 2/1985 | Hanlon | 17/49 X |
| 4,525,984 | 7/1985 | Kollross | 17/49 X |
| 4,536,175 | 8/1985 | Arnold | 17/34 X |

*Primary Examiner*—Willie G. Abercrombie

[57] ABSTRACT

A sausage casing plug is gripped by a pair of gripper arms to pull a short length of casing through a plate; the arms are then rotated to twist the gripped end of the casing; heat seal crimp arms are then moved to surround but not grip the twisted portion; heat is applied while gripper arms continue to rotate to further provide twists in the slug tail to tighten up the material in the form of a "bud" behind the twisted seal; a cutter then severs the tail being held by the gripper arms and seal and crimp arms are opened simultaneously to release the tail. An inserter then pushes the twisted seal and "bud" into the bore of the slug.

11 Claims, 6 Drawing Figures

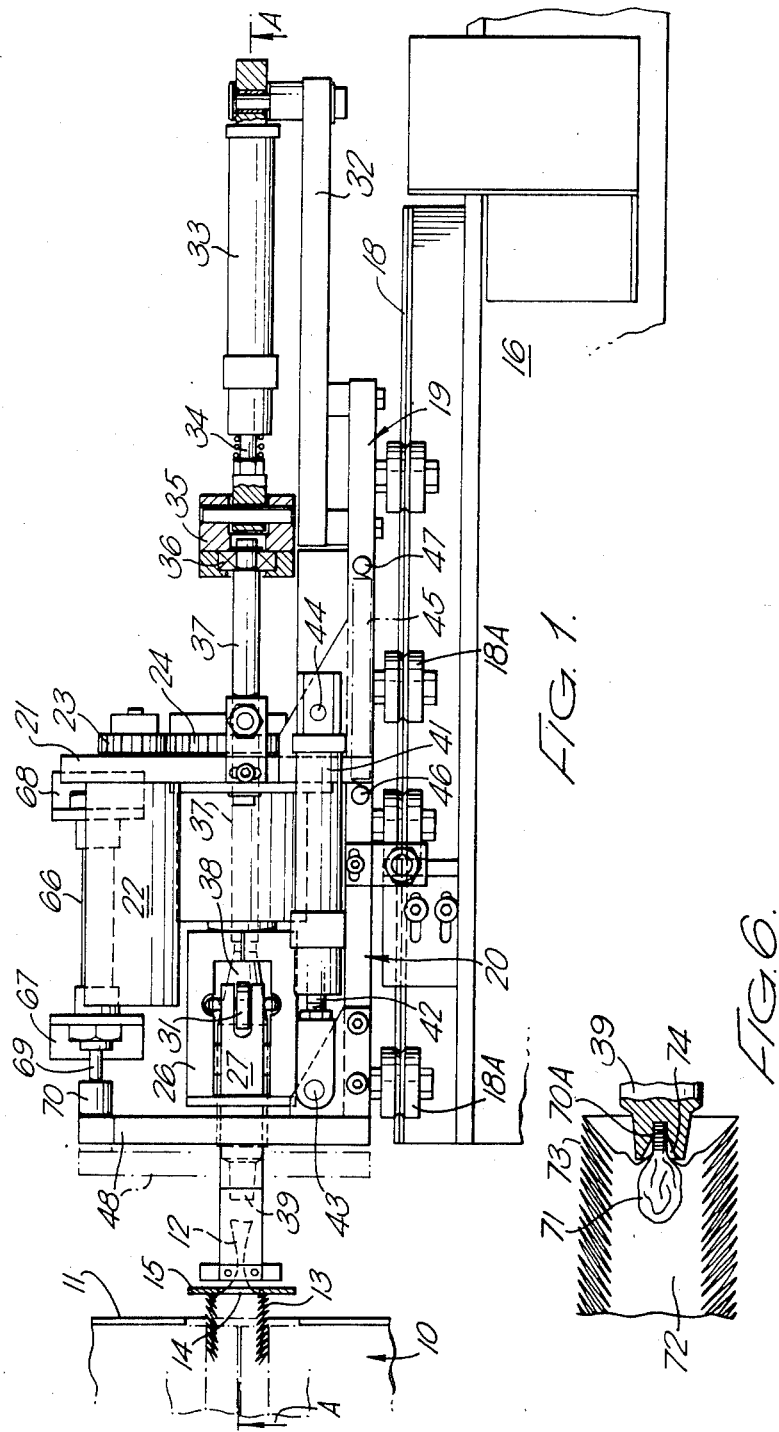

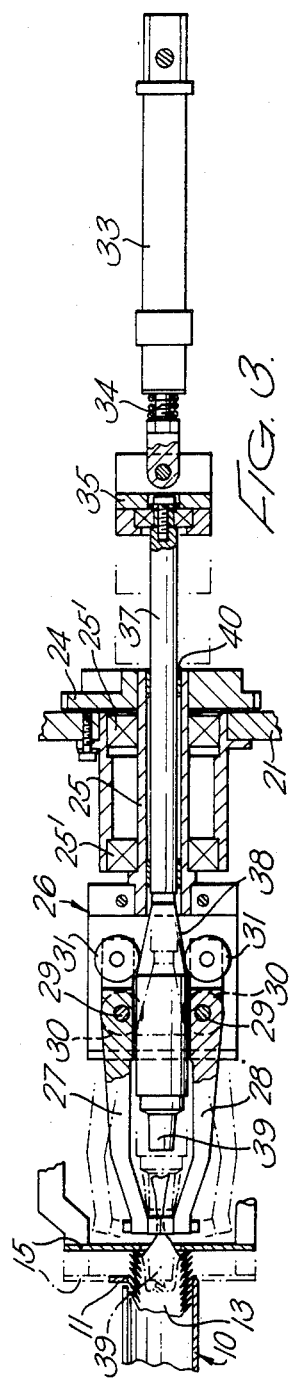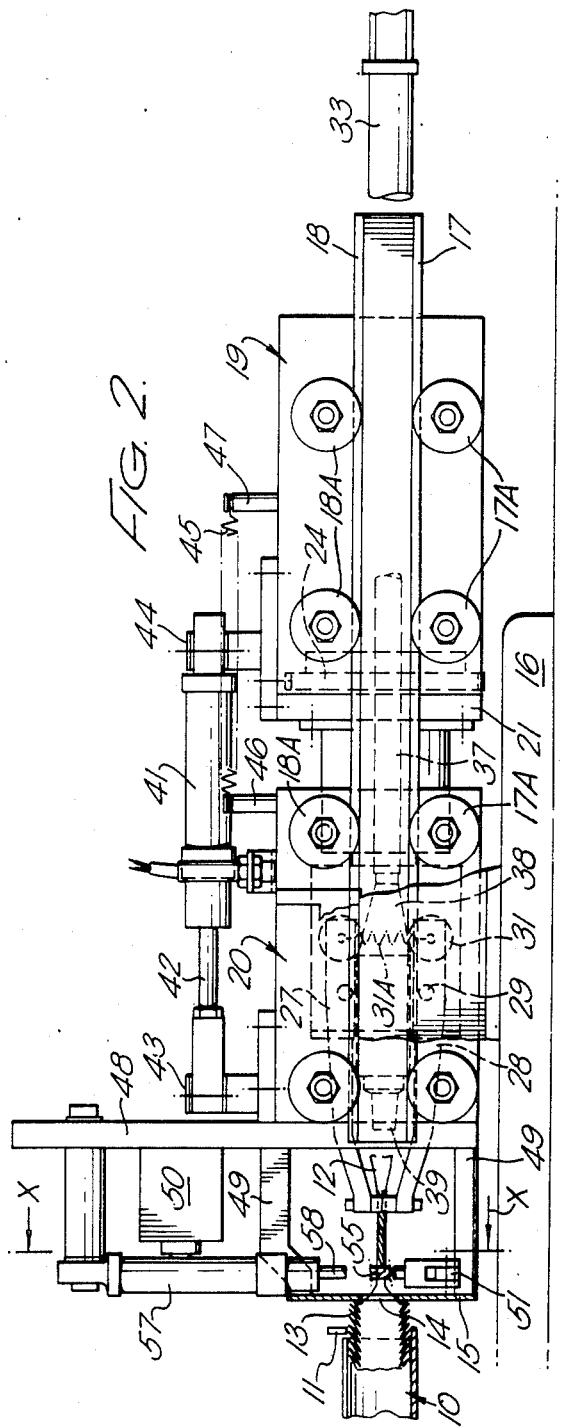

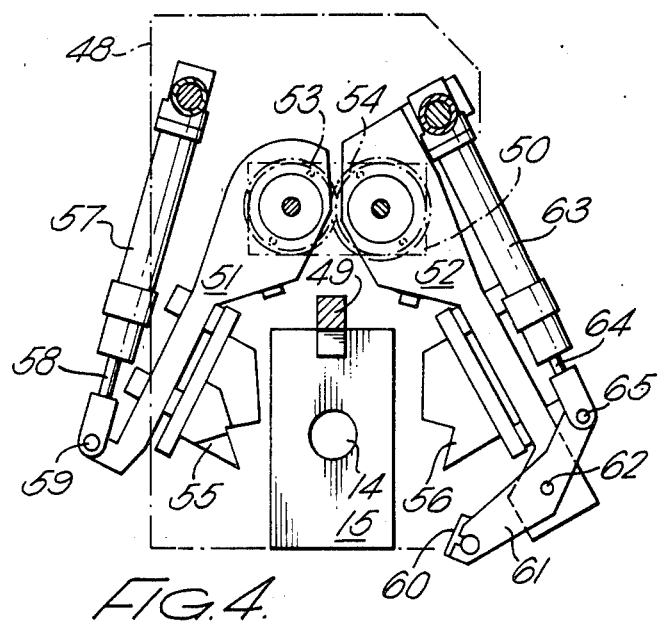

HEAT SEALING MACHINE

This invention relates to a heat sealing machine particularly for heat sealing the ends of shirred sausage casings.

Sausage casings, usually prepared from collagen, are formed by shirring the casing so as to produce a compact shirred slug of sausage casing which is then supplied to sausage manufacturers for filling. With the increasing automation of sausage manufacture there is a requirement that the shirred slugs should be provided to the sausage manufacturer with one end already sealed.

An object of this invention is to provide a machine which will receive and automatically seal one end of a sausage casing using a heat sealing process.

In accordance with the invention the machine comprises means for gripping and rotating one end of the sausage casing so as to twist the sausage casing, means for applying heat to the twisted portion of the sausage casing so as to heat seal the end of the sausage casing, and means to sever the heat sealed portion leaving a short protruding length of heat sealed casing.

Means may also be provided to push the heat sealed end into the adjacent end of the slug so that the length of the slug is not increased by the heat seal.

Preferably the machine is so arranged that the heat sealing takes place whilst the twisting action continues, the heat sealing means being arranged to be in close contact with the twisted portion but not to grip it.

The means for twisting the casing may be carried on one carriage and the means for heat sealing on a second carriage. The second carriage may also carry the means to sever the twisted heat sealed portion. The two carriages may be mounted on a rail and may be relatively moveable by rams.

The means for twisting the casing may comprise a pair of gripper arms supported on one of the carriages and rotatable through gearing from a motor also supported on the carriage.

The gripper arms may be pivoted at one end and may have a cam and roller arrangement to cause the arms to move together or apart. Preferably the cam and roller arrangement is operable by a piston moveable by a piston rod operable by a ram.

The heat sealing means may be in the form of a pair of swinging arms each arm carrying one of the heat sealing blocks and the arms may be brought together, for example, by means of a hydraulic ram operating on one arm and gearing interconnecting the two arms so that the two arms move in unison.

The knife for severing the heat sealed portion may be supportedd on a pivoted arm which may be operable by a hydraulic ram or other suitable means.

In the accompanying drawings:

FIG. 1 is a plan view of a heat sealing machine embodying the invention;

FIG. 2 is a side elevation of the same machine with a driving motor omitted for clarity;

FIG. 3 is a sectional elevation on line A—A indicated in FIG. 1;

FIG. 4 is a section on line X—X shown in FIG. 2;

FIG. 5 is a similar section to FIG. 4 but showing the heat sealing device in its operative position and also showing the severing device or knife in two different positions; and FIG. 6 is a diagram indicating how a sealed end is inserted into a shirred casing.

Slugs of shirred sausage casing which are to have one end heat sealed are supplied from a tray 10 through an aperture in a tray wall 11 so that a twisted tail-end portion 12 of the slug 13 protrudes through an aperture 14 in a slug plate 15.

The heat sealing machine comprises a base 16 on which is mounted a pair of rails 17 and 18, mounted on these rails are two carriages, a gripper carriage 19 which supports the gripper arms and the operating mechanism for them and a heat crimp carriage 20 which supports the heat sealing or heat crimping device and the knife for severing the tail portion of the heat sealed end. Each carriage 19 and 20 is provided with two sets of wheels 17A, 18A which straddle rails 17 and 18 so that the carriages are supported cantilever fashion from the rails.

At the left hand end of the carriage 19 is a front plate 21 which carries a motor 22 which, through gearing 23, 24 drives a shaft 25 supported in bearings 25'. The shaft 25 carrries a block 26 which supports a pair of gripper arms 27, 28 (best seen in FIG. 3). The gripper arms are pivoted at 29 in bearings 30 and have rollers 31 carried at their right hand ends as seen in FIG. 3. A spring 31A shown in FIG. 2 (but omitted from FIG. 3 for clarity) connects the axles of rollers 31 and urges the rollers 31 into contact with a cam surface 38. The purpose of these rollers is to co-operate with cam surface 38 by which the gripper arms can be opened and closed as will be described later. When the motor 22 is operated the drive through gears 23 and 24 rotates the housing 26 and therefore rotates the whole gripper arm assembly.

Supported on a plate 32 mounted on carriage 19 (see FIG. 1) is a pneumatic piston 33. The piston rod 34 of the ram 33 carries a block 35 within which is a bearing 36. In the bearing 36 is mounted a shaft 37. The shaft 37 has a cam surface 38 (see FIG. 3) which co-operates with the rollers 31 to open and close the gripper arm when the piston 33 is operated.

The shaft 37 also carries a hollow inserter 39 the purpose of which is to insert the sealed end of the slug inside the slug at the end of the operation. The shaft 37 is mounted on plain bearings 40 within the shaft 25.

The two carriages 19 and 20 are interconnected by a pneumatic cylinder 41 and piston 42. Piston 42 is connected to a post 43 on carriage 20 and the pneumatic cylinder 41 is connected to a post 44 on carriage 19. The two carriages are also connected by a return spring 45 attached to respective posts 46 and 47 on the two carriages 20 and 19.

The carriage 20 has a front plate 48 which supports the slug plate 15 and carries the heat sealing mechanism and the severing mechanism or knife. The slug plate 15 is supported by brackets 49. The heat sealing mechanism is supported by a box structure 50 attached to the front plate 48. Pivoted on bearings in the box 50 are a pair of heat sealing or crimping arms 51, 52 each of which carries a gear 53 and 54, the gears being in mesh so that movement of one arm will result in corresponding movement of the other arm. (FIGS. 4 & 5).

Arm 51 carries a heat sealing or crimping head 55 and arm 52 carries a corresponding head 56. Means are provided for heating the heads 55 and 56 electrically.

Movement of the two arms 51 and 52 is effected by a pneumatic cylinder 57 the piston 58 of which is connected at 59 to arm 51. Operation of the piston 58 will cause arm 51 to move inwardly or outwardly and cause a corresponding movement of arm 52 so that the heat sealing heads 55 and 56 may be moved into close proximity around an already twisted portion of the end of a slug.

A knife blade 60 is supported on an arm 61 pivoted at 62. This arm can be turned about its pivot by means of a pneumatic cylinder 63 the piston 64 of which is pivoted at 65 to one end of the arm 61. Movement of the piston 64 will cause the arm 61 to pivot and will cause the knife blade to move inwardly so as to sever the twisted portion of the end of the shirred slug when required.

The carriage 20 is moveable by a return pneumatic cylinder 66 carried on plates 67 and 68 which are fixed to stationary structure on the machine. The cylinder 66 has a piston 69 carrying a piston head 70 which abuts the plate 48 so as to move it from the position shown in firm line in FIG. 1 to the position shown in chain dotted line when required.

The operation of the machine is as follows:

A shirred casing slug 13 is delivered from a shirring machine (not shown) into the tray 10 and then is moved so that the slug protrudes through the slug plate 15 with its end 12 in the position shown in dotted line in FIG. 1.

Pneumtic cylinder 33 is then operated so that gripper arms 27 and 28 close onto the protruding tail 12 and then are caused to retract pulling a short length of the casing through the slug plate 15.

The gripper arms are then revolved by operation of twist motor 22, a small number of turns. This has the effect of twisting the casing of the slug.

The crimp or heat sealing arms 51 and 52 are then operated by operating pneumatic cylinder 57, the piston 58 of which brings the heat sealing blocks 55, 56 into close proximity with each other so that they surround but do not actually grip the twisted portion of the casing. Heat is applied electrically and continuously while the heat sealing arms and heat sealing blocks are operative. The gripper arms 27, 28 continue to revolve for a pre-set number of turns to provide further twists in the slug tail to tighten up the gathered material in the form of a "bud" behind the twisted seal. The bud is required as a buffer zone to absorb the initial stress created when sausage filling first surges into the casing.

The gripper arms 27, 28 then cease to revolve and the casing "dwells" for a pre-set period of time ( a few seconds) to allow heat penetration of the twisted seal.

The cutter blade 60 is then operated by operating rams 63 to cut off the tail held by the gripper arms 27, 28. The gripper arms and the heat sealing or crimping arms then open simultaneously to release the tail. A puff of compressed air supplied by means not shown is then used to blow the surplus tail cut off into a collecting tray located beneath the machine.

The inserter 39 is then moved from right to left as shown in FIG. 3 by means of piston 33 so as to push the twisted seal 70 and bud 71 into the bore 72 of the casing slug end 73 (as illustrated in FIG. 6). The inserter is then retracted to its rest position. As seen in FIG. 6, the inserter 39 has a hollow end portion 74 which retains the end of the slug in co-axial alignment with the bore 72 of the casing during this operation.

Before the next slug is delivered the slug plate 15 is pushed by the return pneumatic cylinder 66 and its piston 69 into a position to line-up the finished slug with a tray (not shown) which accepts finished slugs. This involves pushing the end plate 48 from the position shown in firm line in FIG. 1 to the position shown in dotted line in FIG. 1 and the consequential movement of the slug plate etc.

Each cycle of operation takes in total about 15 to 20 seconds.

Apart from the dwell period mentioned above, the heat sealing takes place whilst the slug is being continually twisted by the arms 27 and 28.

Although the machine has been described as operable by pneumatic pistons and cylinders obviously other means can be used for movement of various parts of the machine such as mechanically gearing including rack and pinion and worm drive gearing.

We claim:

1. A machine for receiving and automatically sealing one end of a sausage casing using a heat sealing process, the machine comprising means for gripping and rotating one end of the sausage casing so as to twist the sausage casing, means for applying heat to the twisted portion of the sausage casing so as to heat seal the end of the sausage casing, and means to sever the heat sealed portion leaving a short protruding length of heat sealed casing.

2. A machine according to claim 1 and in which the sausage casing is in the form of a slug and means are provided to push the heat sealed end into the adjacent end of the slug so that the length of the slug is not increased by the heat seal.

3. A machine according to claim 1 and in which said heat sealing means is adapted to be brought into close contact with the twisted portion but not to grip it, whereby heat sealing can take place whilst the twisting action continues.

4. A machine according to claim 1 including two carriages, the means for twisting the casing being supported by the first carriage and the means for heat sealing being supported by the second carriage.

5. A machine according to claim 4 and in which the second carriage also carries the means to sever the twisted heat sealed portion.

6. A machine according to claim 4 and including a rail and rams, the two carriages being mounted on the rail and relatively moveable by rams.

7. A machine according to claim 4 and in which the means for twisting the casing comprises a pair of gripper arms supported on one of the carriages and a motor also supported on the carriage, the pair of gripper arms being rotatable by the motor.

8. A machine according to claim 7 and in which said gripper arms are pivoted at one end and including a cam and roller arrangement to cause the arms to move together or apart.

9. A machine according to claim 1 and in which the heat sealing means comprises a pair of heat sealing blocks, and a pair of swinging arms each arm carrying one of the heat sealing blocks.

10. A machine according to claim 9 and comprising a ram and gearing so arranged that said arms may be brought together by means of the ram operating on one arm, said gearing interconnecting the two arms so that the two arms move in unison.

11. A machine according to claim 1 and in which the means for severing the heat sealed portion comprises a knife supported on a pivoted arm.

* * * * *